(12) United States Patent
Drouvot et al.

(10) Patent No.: US 9,856,755 B2
(45) Date of Patent: Jan. 2, 2018

(54) THERMAL INTEGRATION OF A CARBON DIOXIDE CAPTURE AND COMPRESSION UNIT WITH A STEAM OR COMBINED CYCLE PLANT (75) Inventors: Paul Drouvot, Villook-Neuf (FR); Hongtao Li, Aargau (CH); Jörg Dietzmann, Aargau (CH)

(73) Assignee: General Electric Technology GmbH, Baden (CH)

( * ) Notice: Subject to any disclaimer, the term of this patent is extended or adjusted under 35 U.S.C. 154(b) by 366 days.

(21) Appl. No.: 13/093,040

(22) Filed: Apr. 25, 2011

(65) Prior Publication Data
US 2011/0265477 A1 Nov. 3, 2011

(30) Foreign Application Priority Data

Apr. 28, 2010 (EP) .................................. 10161290

(51) Int. Cl.
F01K 17/02 (2006.01)
F01K 17/06 (2006.01)
(Continued)

(52) U.S. Cl.
CPC .............. F01K 17/02 (2013.01); B01D 53/14 (2013.01); B01D 53/1475 (2013.01);
(Continued)

(58) Field of Classification Search
CPC . Y02E 20/16; Y02E 20/18; F02C 3/34; F02C 6/18; F01K 23/10; F01K 13/00;
(Continued)

(56) References Cited

U.S. PATENT DOCUMENTS 4,420,950 A * 12/1983 Bodas et al. .................... 62/402
5,025,631 A 6/1991 Garbo
(Continued)

FOREIGN PATENT DOCUMENTS

CN 1273139 A 11/2000
CN 101230798 A 7/2008
(Continued)

OTHER PUBLICATIONS

English Language Machine Translation of DE 4303174.*
(Continued)

*Primary Examiner* — Mark Laurenzi
*Assistant Examiner* — Wesley Harris
(74) *Attorney, Agent, or Firm* — GE Global Patent Operation; Cynthia W. Flanigan (57) ABSTRACT A power plant system including a fossil fuel fired power plant (6) for the generation of electricity, a carbon dioxide capture and compression system (5, 13), and an external heat cycle system has at least one heat exchanger (1,2,3) for the heating of the flow medium of the external heat cycle system. The heat exchanger (1,2,3) is connected to a heat flow from the $CO_2$ capture plant (5) or a $CO_2$ compression unit (13). A return flow from the heat exchanger (1,2,3) is led to the $CO_2$ capture and compression system (5,13) or to the power plant (6). The power plant system allows an increase in overall efficiency of the system.

19 Claims, 2 Drawing Sheets (51) Int. Cl.
  *F01K 23/10*   (2006.01)
  *F02C 6/18*    (2006.01)
  *F01K 17/04*   (2006.01)
  *F02C 3/34*    (2006.01)
  *B01D 53/14*   (2006.01)
  *F01K 13/00*   (2006.01)

(52) U.S. Cl.
  CPC .............. *F01K 13/00* (2013.01); *F01K 17/04* (2013.01); *F01K 17/06* (2013.01); *F01K 23/10* (2013.01); *F02C 3/34* (2013.01); *F02C 6/18* (2013.01); *B01D 2257/504* (2013.01); *B01D 2259/65* (2013.01); *Y02C 10/00* (2013.01); *Y02C 10/02* (2013.01); *Y02C 10/04* (2013.01); *Y02C 10/06* (2013.01); *Y02C 10/08* (2013.01); *Y02C 10/10* (2013.01); *Y02C 10/12* (2013.01); *Y02C 10/14* (2013.01); *Y02E 20/14* (2013.01); *Y02E 20/16* (2013.01); *Y02E 20/18* (2013.01); *Y02E 20/326* (2013.01)

(58) Field of Classification Search
  CPC .......... F01K 17/02; F01K 17/04; F01K 17/06; B01D 2257/504; B01D 53/14; B01D 53/1475; B01D 2259/65; Y02C 10/04; Y02C 10/06; Y02C 10/10; Y02C 10/14; Y02C 10/08; Y02C 10/12; Y02C 10/02; Y02C 10/20; Y02C 10/00
  USPC ......... 60/646, 653, 654, 662, 663, 677–679, 60/657, 648
  See application file for complete search history.

(56) References Cited

U.S. PATENT DOCUMENTS

| 6,210,467 | B1  |   | 4/2001 | Howard |          |
|-----------|-----|---|--------|--------|----------|
| 6,764,530 | B2  | * | 7/2004 | Iijima | 95/183   |
| 7,377,967 | B2  | * | 5/2008 | Reddy et al. | 96/242 |
| 7,895,822 | B2  |   | 3/2011 | Hoffmann et al. |   |
| 8,347,627 | B2  |   | 1/2013 | Yamashita et al. |  |
| 2007/0101989 | A1 | * | 5/2007 | Strathman | F01K 13/00 126/636 |

FOREIGN PATENT DOCUMENTS

| CN | 101464072 A | 6/2009 |
| CN | 101666248 A | 3/2010 |
| DE | 4303174 | 8/1994 |
| JP | 58-208117 A | 12/1983 |
| JP | 03-193116 A | 8/1991 |
| JP | 05-184868 A | 7/1993 |
| JP | 06-129211 A | 5/1994 |
| JP | 2000-507326 A | 6/2000 |
| JP | 2002-079052 A | 3/2002 |
| JP | 2002-316809 A | 10/2002 |
| JP | 2003-193910 A | 7/2003 |
| JP | 2005-254212 A | 9/2005 |
| JP | 3940481 B2 | 4/2007 |
| JP | 2010-088982 A | 4/2010 |
| WO | WO99/24697 | 5/1999 |
| WO | 2007/133595 A2 | 11/2007 |

OTHER PUBLICATIONS

Desideri, U., et al., "CO2 Capture in Small Size Cogeneration Plants: Technical and Economical Considerations," Energy Convers. Mgmt. 1998, vol. 39, No. 9, pp. 857-867, Elsevier Science Publishers, Oxford, GB.

European Search Report for EP Patent App. No. 10161290.1 (dated Dec. 28, 2010).

First Office Action dated Jun. 4, 2014 issued by the Chinese Patent Office in corresponding Chinese Patent Application No. 201110113419.4, and an English translation thereof.

Japanese Office Action (Notification of Reasons for Refusal) dated Mar. 2, 2015 by the Japanese Patent Office in Japanese Patent Application No. 2011-099541 and English language translation of Japanese Office Action (18 pgs).

* cited by examiner

THERMAL INTEGRATION OF A CARBON DIOXIDE CAPTURE AND COMPRESSION UNIT WITH A STEAM OR COMBINED CYCLE PLANT

This application claims priority under 35 U.S.C. §119 to European App. No. 10161290.1, filed 28 Apr. 2010, the entirety of which is incorporated by reference herein.

BACKGROUND

Field of Endeavor

The present invention relates to a method for the operation of a power plant system having a power plant for the generation of electricity, in particular of a combined cycle power plant or a steam power plant operated with fossil fuels, a carbon dioxide capture and compression system, and an external heat cycle system. It furthermore relates to a power plant system useful for practicing the method.

Brief Description Of The Related Art

Conventional fossil fuel-burning power plants use a steam cycle for power generation, in the case of the use of gas turbines, in a so-called combined cycle power plant, in combination with gas turbines. Steam cycles are also used in newer power plants, such as Integrated Gasification Combined Cycle (IGCC) power plants or Natural Gas Combined Cycle (NGCC) power plants. In a coal-fired steam cycle power plant, about 40% of the heat energy contained in the fossil fuel is converted to electricity. This leaves a large portion of the energy wasted in the water cooling towers or other water cooling facilities. The water cooling facilities transfer all of the waste heat in the low pressure exhaust steam to the environment through the vaporization of cooling water. Combined power plants have a somewhat higher overall efficiency, up to 59%.

On the other hand, $CO_2$ separation from post-combustion flue gas requires a large amount of heat (in the form of steam). For example, the current state-of-the-art monoethanol amine (MEA) absorption process requires about 4 MJ of total heat for every kilogram of $CO_2$ captured.

$CO_2$ separation processes thus are energy intensive. The required energy is provided by steam in the power plant. The extraction of steam from the steam turbine reduces the electricity generation (output, overall efficiency). For the same amount of steam, the higher the pressure (and thus the temperature) of the extracted steam is, the higher the loss of the electricity will be. State-of-the-art amine-based absorption processes reduce electricity output.

This energy cost, and the associated financial cost, inhibits the adoption of $CO_2$ separation. With conventional MEA-based absorption processes, the cost of $CO_2$ separation from post-combustion flue gases requires a significant amount of the total $CO_2$ sequestration cost. High separation cost is the main reason for the delay in $CO_2$ emission control. High $CO_2$ separation cost is also hindering the acceptance of $CO_2$ based Enhanced Oil Recovery technology.

The implementation of a $CO_2$ capture and compression system on a combined cycle or steam power plant leads to a drop of its overall efficiency. The $CO_2$ capture process requires heating and cooling facilities, which are respectively provided by steam extraction and main cooling water or another cooling source. The $CO_2$ compressor requires either electricity if it is driven by electrical motor or steam if driven by an auxiliary steam turbine. The $CO_2$ compression further requires a capability for cooling the $CO_2$.

Extensive studies have been conducted in the area concerning $CO_2$ capture as reflected in the following publications. U.S. Patent App. Pub. Nos. 2007/0256559, 2007/0213415, and 2006/0032377 describe $CO_2$ capture processes. Specifically, U.S. Patent App. Pub. No. 2007/0256559 describes that the condensate from the amine reboiler is directly sent back to the main condensate line. U.S. Patent App. Pub. No. 2006/0032377 proposes to flash the condensate coming from the amine reboiler, and to use the steam phase in a "semi-lean regenerator".

The prior art describes the use of main cooling water from a cooling tower or another cooling source to dump the heat from the $CO_2$ capture and compression system. Air could also be an alternative cooling media. The cooling concept increases the efficiency of the $CO_2$ compression unit due to low inlet temperatures to the compressors.

Figure 1:
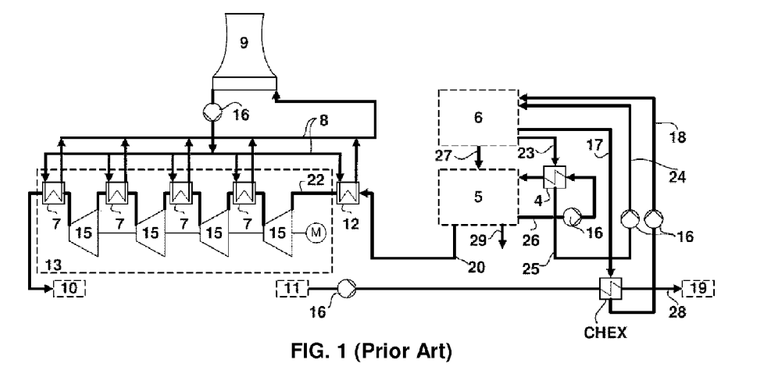
FIG. 1 shows a power plant according to the prior art including a steam power plant or a combined cycle power plant, a carbon dioxide capture and compression plant, and an external heat cycle system.

A known concept for a power plant system with a power plant, a $CO_2$ capture system and a district heating includes the use of steam extraction from the power plant steam turbine or boiler as shown schematically in FIG. 1.

FIG. 1 shows a power plant system with a power plant 6, which can be a steam power plant or a combined cycle power plant, and that directs its exhaust gas containing carbon dioxide via a line 27 to a carbon dioxide capture plant 5. In this carbon dioxide capture plant 5 an amine solution is cycled as an absorber liquid, where in a first cycle stage this absorber solution is in contact with the exhaust gases and absorbs the carbon dioxide. It is then fed through line 26 by a pump 16 and fed through an amine reboiler 4, where it is heated such that it releases the carbon dioxide in highly concentrated form. The concentrated carbon dioxide is subsequently fed via line 20 to a compression and cooling unit 13. The compressed $CO_2$ is finally taken to a storage facility 10. In this example, there is provided a sequential compression system with sequential compressors 15 driven by a motor M, wherein intercoolers 7 are arranged between the compressors 15 and a precooler 12 is arranged upstream of the first compressor. The cooling medium for the intercoolers 7 is directed via a cooling water line 8 to a cooling tower 9, where the heat of the cooling medium is dissipated to the atmosphere.

The heating in the amine reboiler 4 is facilitated by steam generated in the water steam cycle of the power plant 6. A first steam extraction line 23 from the water steam cycle of the power plant 6 leads to heat exchanger or amine reboiler 4 for heating of the $CO_2$ absorber solution. The return flow from the reboiler 4 is directed through line 25 and 24 to the power plant 6, where the condensate return lines typically include a feed water tank, various preheaters, and a pump 16.

A further steam extraction line 17 leads from the water steam cycle of the power plant 6 to a conventional heat exchanger CHEX, in which heat from the steam extraction is transferred to a heating medium in a cycle line 28 of a client network or external heat cycle system such as a district heating system. The system includes an inflow from a unit 11 and an outflow to a unit 19.

SUMMARY

One of numerous aspects of the present invention includes an improved and in particular more efficient method of operation of a power plant system as well as a power plant system useful for carrying out this method.

More specifically, another aspect of the present invention relates to a method for the operation of a power plant system including a power plant for the generation of electricity, in particular a combined cycle power plant with a gas turbine and a steam turbine, or a steam power plant operated with fossil fuels. The power plant system is integrated with an external heat cycle system. The power plant system furthermore includes a system with a carbon dioxide capture plant and a carbon dioxide compression unit.

The carbon dioxide capture system includes a carbon dioxide capture plant, in which carbon dioxide is absorbed from the exhaust gases of the power plant by an absorber solution and carbon dioxide gas is released from the absorbing solution by increasing the temperature of the absorber solution by directing it through a reboiler.

The operation of the power plant system with carbon capture and compression further includes transferring heat from the steam flow of the power plant by a main conventional heat exchanger to the flow medium of an external heat cycle system such as a district heating system or a civic or industrial system requiring a heat flow. The external heat cycle system may be understood as a system not part of the power plant or carbon dioxide capture and compression system. For this, steam massflow extracted from the steam turbine of the power plant is directed through the main heat exchanger, where its heat is transferred to the flow medium of the external heat cycle system. The return flow or condensate from the main heat exchanger is directed back to the water steam cycle of the power plant.

In accordance with principles of the present invention, heat from the carbon dioxide capture and compression system is transferred to the flow medium of the external heat cycle system by at least one additional heat exchanger and the return flow from this at least one additional heat exchanger is directed to the power plant or carbon dioxide capture and compression system.

The heat from the carbon dioxide capture and compression system and transferred to the external heat cycle system is surplus heat that would otherwise be dissipated to the environment outside of the power plant system, for example by a cooling facility such as a cooling tower.

The operation of the power plant system according to principles of the present invention effects a reduction of the steam massflow extracted from the steam turbine, a result of which the efficiency of the power plant is increased. Typically, a heat exchanger, such as the main heat exchanger in exemplary embodiments of the present invention, must be controlled such that it can supply a given temperature and heat load to the heating medium of the external heat cycle system. The heat transferred from the $CO_2$ capture and compression system provides heat to the heating medium of the external cycle system in addition to that provided by the main heat exchanger. Thereby, the heat exchanged in the main heat exchanger can be reduced and the necessary steam extraction can be reduced as well.

In a first embodiment of a method adhering to principles of the present invention, a return condensate flow from the reboiler for the $CO_2$ absorber solution is directed to a first heat exchanger for heat exchange with the flow medium of the external heat cycle system. The reboiler is a heat exchanger that exchanges heat between steam extracted from a HRSG or boiler of the water steam cycle of the power plant and the $CO_2$ absorber solution of the $CO_2$ capture plant. The return flow from the first heat exchanger is directed as a condensate flow to the water steam cycle of the power plant.

By this operation, the return flow from the first heat exchanger directed back to the water steam cycle of the power plant facilitates that the temperature of the feedwater in the power plant's feedwater tank is maintained at a temperature level such that the heat available in the HRSG or boiler is used most efficiently. More specifically, the temperature of the feedwater can be maintained at the temperature, which the feedwater in the feedwater tank would have in the case when the $CO_2$ capture plant and the first heat exchanger are not in operation. Therefore, the power plant operation according to this invention effects both the efficient use of the heat from the $CO_2$ capture plant and optimally efficient operation of the HRSG or boiler of the power plant.

A second exemplary embodiment includes operating one or more heat exchangers for the cooling of $CO_2$ in the $CO_2$ compression unit and directing a return flow from the one or more heat exchangers to a second heat exchanger, which is operated to transfer heat to the flow medium of the external heat cycle system. The return flow from the second heat exchanger is directed to a cooling cycle operatively connected to the $CO_2$ compression unit of the $CO_2$ capture system.

By this operation, the overall efficiency of the power plant is increased in similar manner as is the case for the first embodiment of the inventive operation. The heat used from the return flow from the heat exchanger(s) or cooler(s) of the $CO_2$ compression unit is surplus heat that otherwise would be dissipated to the environment. Instead, according to principles of the present invention, this heat is used to heat the flow medium of the external heat cycle system. The heating of the flow medium, in addition to that by the main heat exchanger, allows that the main heat exchanger for the external heating system can operate with a lower load and consequently the massflow of the steam extraction from the water steam cycle of the power plant can be reduced. Thereby more steam massflow can be used in the power plant for driving the turbine, thus increasing the efficiency of the power plant.

In a third exemplary embodiment, heat from the carbon dioxide capture and compression system is transferred to the flow medium of the external heat cycle system by a third heat exchanger, by directing a carbon dioxide flow generated by the carbon dioxide capture plant to the third heat exchanger, which is operated to transfer heat from the $CO_2$ flow to the flow medium of the external heat cycle system. The carbon dioxide flow returning from the third heat exchanger is directed to the carbon dioxide compressing unit.

By this operation, the heating medium of the external heat cycle system is heated by means of surplus heat provided by the $CO_2$ flow generated by the $CO_2$ capture plant. The main heat exchanger for the external heating cycle system may again be operated at a lower load such that the steam extraction from the water steam cycle of the power plant can be reduced and the efficiency of the power plant consequently increased.

If the first, second, and/or third heat exchangers are arranged in series with the main heat exchanger, they are preferably arranged (with respect to the direction of flow in the external heat cycle system) upstream of the main heat exchanger. Such arrangement facilitates a reduction of the energy losses in the main heat exchanger as it functions on the basis of a pure condensing process (fixed temperature), while the first, second, and third heat exchangers operate on the basis of a subcooling process (decreasing temperature).

Further embodiments include operating the power plant by combining two or more of the above transfers of heat to the heating medium of the external heat cycle system, where this heat is surplus heat from the $CO_2$ capture and compression system. The transfer of heat to the flow medium of an external heat cycle system by two or more of the above methods can be performed by operation of the first and second, or first and third, or second and third heat exchanger, or of the first and second and third heat exchanger. The heat exchangers can be operated either in a series arrangement with respect to the flow of the external heat cycle system, where the several heat exchangers can be arranged in a specifically determined order. The order can be determined on the basis of various parameters of plant operation and design including, for example, the temperature of the heat transfer media and the operation load of the individual heat exchangers, or space and cost. The two or more heat exchangers can also be operated in parallel or in a combination of parallel and series arrangement.

Exemplary embodiments thereof are described in connection with the figures.

The combination of the first, second, and third heat exchanger allows for a particularly versatile heat exchange between the power plant, the carbon dioxide recovery and compression system, and the external heat cycle system in the case of different operation modes of each of the power plant, $CO_2$ capture plant, and the external heat cycle system.

A further exemplary operation method according to principles of the present invention includes the operation of several heat exchangers in the place of each of the first, second, and/or third heat exchanger. The several heat exchangers can be operated in a parallel and/or in series arrangement. Such operation method can allow an optimized operation of the integrated power plant for each operating mode of the plant.

According to an exemplary embodiment, a method to operate the power plant system includes, in addition to an embodiment using the third heat exchanger, transferring heat by a backup heat exchanger or cooler, which transfers heat from the flow of extracted $CO_2$ to a $CO_2$ cooling medium prior to a compression of the $CO_2$. This ensures a cooling of the $CO_2$ flow even if the external heat cycle system is not in operation or it does not require any heating by the $CO_2$ flow in the third heat exchanger.

As mentioned above, typically the absorber solution is an amine solution, preferably as used in a monoethanolamine process.

Furthermore, yet another aspect of the present invention relates to a power plant system useful for using and implementing one or more the methods described herein. It specifically relates to a power plant system with a power plant for the generation of electricity, in particular a combined cycle power plant or a steam power plant operated with fossil fuels. The system furthermore includes a carbon dioxide capture and compression system, wherein the carbon dioxide capture and compression system has a carbon dioxide capture plant with a cycle of an absorber solution for the absorption of carbon dioxide from the exhaust gases of the power plant and a reboiler for the increase of the temperature of the absorber solution in order to release the absorbed carbon dioxide. The carbon capture and compression system furthermore includes a carbon dioxide compression unit for the compression and cooling of the carbon dioxide after its release from the absorber solution. The power plant system furthermore includes a main heat exchanger for heating the flow medium of an external heat cycle system. The main heat exchanger is configured and arranged for heating the flow medium of the external heat cycle system by steam extracted from the water steam cycle of the power plant.

The external heat cycle system can be a district heating system or any civic or industrial system in need of heat.

Specifically, an exemplary power plant system is characterized in that at least one heat exchanger is configured and arranged for heating the flow medium of the external heat cycle system by at least one heat flow generated by the carbon dioxide capture and compression system and the at least one heat exchanger is further configured and arranged for directing its return flow to the power plant or to the carbon dioxide capture and compression system. For this, an appropriate line or lines for the heat lead(s) from the carbon dioxide and compression system to the at least one heat exchanger, and a further line leads from the at least one heat exchanger to the power plant or to the carbon dioxide capture and compression system.

In a first embodiment, a first heat exchanger is configured and arranged for heating of the flow medium of the external heat cycle system by the return condensate of the reboiler. For this, lines for directing the return condensate from the reboiler for the $CO_2$ absorber solution lead from the reboiler to the first heat exchanger. Furthermore, a line for the return flow of the condensate of the first heat exchanger leads from the first heat exchanger to the water steam cycle of the power plant.

A second embodiment of the power plant system according to principles of the present invention has a second heat exchanger configured and arranged for heating the flow medium of the external heat cycle system with heat from the $CO_2$ compression unit. For this, lines direct the cooling medium of the carbon dioxide compression and cooling unit to the second heat exchanger. A line for the return flow of the second heat exchanger leads from the second heat exchanger to the cooling cycle operatively connected to the $CO_2$ compression unit.

A third embodiment of the power plant system according to principles of the present invention includes a third heat exchanger configured and arranged for heating the flow medium of the external heat cycle system by the $CO_2$ flow generated by the $CO_2$ capture plant. For this, it includes a line for directing the $CO_2$ flow extracted from the flue gases by the $CO_2$ capture plant to the third heat exchanger and a further line for directing the return $CO_2$ flow from the third heat exchanger to the $CO_2$ compression unit.

Two or three of the first, second and third heat exchangers can be arranged in a series or parallel arrangement or in a combination arrangement of both for the heating of the flow medium of the external heat cycle system.

Preferably, one or more of the three heat exchangers are arranged in the flow of the external heat cycle system upstream of the main heat exchanger.

Furthermore, in view of an optimized use of the heat available from the $CO_2$ capture and compression and cooling unit, the first heat exchanger is preferably arranged in the flow of the medium of the external heat cycle system downstream of the second and third heat exchanger, while the third heat exchanger is arranged downstream of the second heat exchanger. Alternatively, the first heat exchanger is arranged in the flow of the medium of the external heat cycle system upstream of the third and second heat exchanger, and the third heat exchanger is arranged upstream of the second heat exchanger.

The external heat cycle system can generally be a local heating system as mentioned above, preferably it can be an external heat cycle system or client network such as a district heating system, a greenhouse heating system or a heating system for an industrial application with a closed or open heating liquid/heating fluid cycle medium which is independent from the power plant and/or carbon dioxide capture and compression system.

Furthermore, another aspect of the present invention relates to the use of excess heat from a carbon dioxide capture plant for the heating of an external heat cycle system, preferably for a local heating system, preferably a district heating system, a greenhouse heating system, or a heating system for an industrial application.

BRIEF DESCRIPTION OF THE DRAWINGS

Preferred embodiments of the invention are described in the following with reference to the drawings, which illustrate exemplary embodiments of the present invention and shall not be considered to limit the scope of protection. In the drawings.

In the figures elements with same reference numerals designate the same elements and fulfill the same function unless described otherwise.

DETAILED DESCRIPTION OF EXEMPLARY EMBODIMENTS

Figure 2:
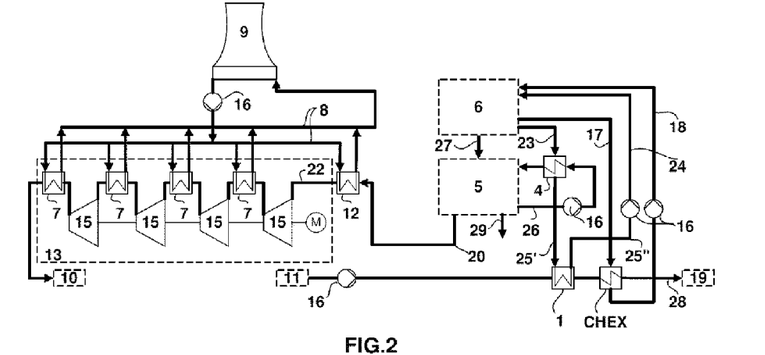
FIG. 2 shows a power plant according to a first embodiment to the invention including a steam power plant or a combined cycle power plant with a carbon dioxide capture and compression system thermally integrated with an external heat cycle system by a first heat exchanger.

FIG. 2 shows a power plant 6 with a $CO_2$ capture plant 5 having a line 27 for flue gas leading from the power plant to the $CO_2$ capture plant 5, a line 20 leading the extracted $CO_2$ away from the capture plant 5, and a line 29 releasing flue gas free of $CO_2$. An absorber solution cycle includes a line 26 for the absorber solution leading from the capture plant to a reboiler 4 for the absorber solution. A steam extraction line 23 directs steam for the operation of the reboiler 4 from the power plant's water steam cycle, for example from the heat recovery steam generator, and a line 25 leads return condensate away from the reboiler 4. The line 20 for the $CO_2$ extracted extends from the $CO_2$ capture plant to a precooler 12, which is arranged prior to the $CO_2$ compression unit 13.

The power plant of FIG. 2 includes an integration of the power plant and $CO_2$ capture and compression and cooling system with an external heat cycle system. The heat cycle system includes a cycle line 28 for a medium to be heated, for example water, a source unit 11, and a user 19, to which the heated outflow of the cycle is directed. The embodiment according to FIG. 2 includes a line 25' directing the return condensate flow from the amine reboiler 4 to a first heat exchanger 1 configured and arranged for heating a flow medium in line 28 of the external heat cycle system. In the heat exchanger 1, the heat contained in the condensate may be transferred to the flow medium in line 28. The return flow of the heat exchanger 1 is directed via line 25" to line 24, which directs the feedwater back to the power plant 6.

The typical temperature range of the condensate flow resulting from the amine reboiler 4 can range from 160° C.-100° C.

The configuration according to this embodiment of the invention contributes in multiple ways to the overall efficiency of the power plant. Compared to the plant configuration in FIG. 1, the temperature level of the return flow back to the water steam cycle is reduced. Thereby, the heat available in the HRSG or boiler may be used more effectively and the overall thermal efficiency of the power plant and external heat cycle system is increased. Due to the integration of the $CO_2$ capture plant with the external heat cycle system by heat exchanger 1, the remaining heat from the reboiler 4 is used to contribute heat to the external cycle system. The temperature of the flow in line 28 at the outflow to the user 19 of the cycle system is generally given at a required level. In order to reach that required temperature level in line 28 at user 19, the main heat exchanger CHEX in FIG. 2 has to contribute less than the heat exchanger HEX in the configuration of FIG. 1. Thereby, the massflow of the steam extraction 17 for the main heat exchanger CHEX can be reduced. Consequently, the power plant 6 suffers less energy loss and can operate at a higher efficiency.

Figure 3:
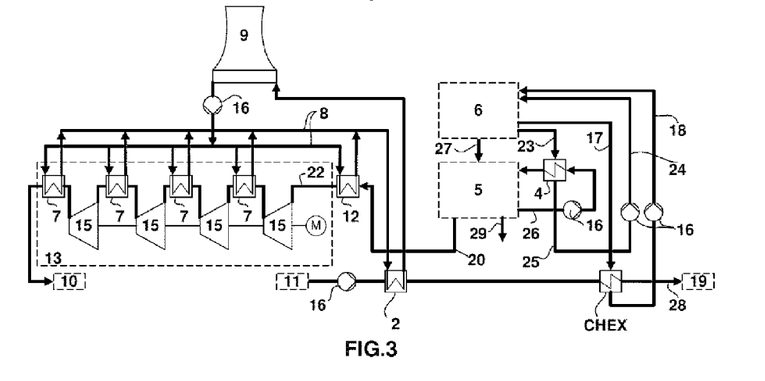
FIG. 3 shows a power plant according to a second embodiment to the invention including a steam power plant or a combined cycle power plant with a carbon dioxide capture and compression system thermally integrated with an external heat cycle system by a second heat exchanger.

FIG. 3 shows a further power plant with $CO_2$ capture and compression system and an integrated external heat cycle system. The flow medium of the external heat cycle system is heated by the main heat exchanger CHEX, which is provided by the steam extraction 17 from the water steam cycle of the power plant. In addition, it is heated by a heat exchanger 2 arranged in the heat cycle upstream from the main heat exchanger. The heat exchanger 2 is provided with heat from the flow for cooling the $CO_2$ extracted by the capture system 5. The return flow of the cooling medium for a precooler 12 and from several intercoolers 7 arranged between the several $CO_2$ compressors 15 is directed via line 8 to the heat exchanger 2. The temperature of the flow in line 8 may be about 100° C. The cooling cycle of the carbon dioxide compression unit 13 is thus used actively for heat transfer to the client network 11. This is most efficiently done as illustrated in FIG. 3 by using the cooling water lines 8 essentially just upstream of the cooling tower 9, so where the cooling medium in the cycle 8 has the highest temperature, for heat exchange with the water in line 28 of the client network in a heat exchanger 2. Heat exchanger 2 is preferably arranged upstream of the conventional heat exchanger CHEX with respect to the flow of the cooling medium in cycle 8.

The return flow from this heat exchanger 2 is then directed to a cooling facility 9. Heat gained from the $CO_2$ cooling is put to use in the heat cycle system. The heat exchanger 2 transfers heat to the cycle system and as such supports the main heat exchanger CHEX. In order to reach a required temperature of the flow medium in line 28 for user 19, the main heat exchanger CHEX in FIG. 3 needs less heat compared to the main heat exchanger shown in the power plant in FIG. 1. By the arrangement of heat exchanger 2, the massflow of the steam extraction in line 17 may be reduced and the efficiency of the power plant increased.

Figure 4:
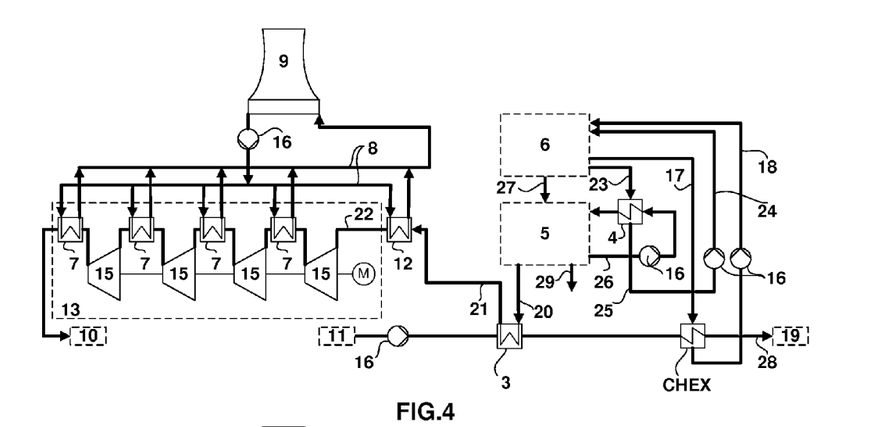
FIG. 4 shows a power plant according to a third embodiment to the invention including a steam power plant or a combined cycle power plant with a carbon dioxide capture and compression system thermally integrated with an external heat cycle system by a third heat exchanger.

FIG. 4 shows another embodiment of the power plant according to principles of the present invention, where a heat exchanger 3 is arranged in the external heat cycle system, upstream of the main heat exchanger CHEX. Heat from the carbon dioxide flow extracted by the carbon capture plant 5 is used for heating purposes in the external cycle system. For this, a carbon dioxide line 20 between the carbon dioxide capture plant 5 and the carbon dioxide compressor unit 13, which transports the carbon dioxide at an elevated temperature, is directed to the heat exchanger 3 prior to being directed to the precooler 12 and the compressor unit 13.

In the heat exchanger 3, heat from the $CO_2$ flow is transferred to the flow in line 28 of a client network. Downstream of heat exchanger 3, in order to allow for different operational regimes, the line 21 is coupled to pre-cooler 12 prior to being fed via line 22 to the first stage of the compressor 15. The pre-cooler 12 serves as a back-up cooler for the $CO_2$. Heat exchange in the back-up cooler 12 takes place by coupling to the cooling circuit 8 of the compressor unit 13.

An idea embodied in the system illustrated in FIG. 4 thus hinges again upon using heat from the $CO_2$ Capture and Compression system (CCS) in order to increase the overall power plant efficiency. The thermal integration of the CCS with the power plant includes the integration and transfer, either direct or indirect, of heat from the CCS to a client network 11 requiring heat by the $CO_2$ condenser or heat exchanger 3 located between the $CO_2$ capture plant 5 (more precisely downstream of the regenerator column) and the $CO_2$ compressor unit 13 (before the first compression stage). The client network 11 is an external consumer of the power plant that requires heat, such as a district heating, a greenhouse heating, biomass, or any industrial applications.

Heat exchanger CHEX is required downstream of the $CO_2$ condenser or heat exchanger 3. The heat exchanger CHEX is basically fed by steam in line 17 extracted from the main steam turbine, as for typical heat exportation. The steam can be extracted at different pressure levels, which will require different heat exchangers in series. This heat exchanger CHEX is used as a heater if the heat integrated by the $CO_2$ condenser 3 is not sufficient to cover the requirements of the client network 11 (in terms of temperature and/or heat load) or if the $CO_2$ capture and compression unit is not in operation at all. It should be designed to cover the requirements of the client network 11 when the integrated the $CO_2$ condenser 3 is not in operation. The heat load required by the client's network 11 and the temperature of the water delivered to the client network is controlled by the steam extraction from low pressure steam turbine steam extraction, from an intermediate pressure-low pressure cross-over pipe, or from low pressure steam of a heat recovery steam generator. This steam can have a pressure level from 1 bar up to 5 bar.

Heat exchanger CHEX can be either one heat exchanger supplied by one pressure level, or two heat exchangers in sequence that have two different steam supply pressure levels where the load distribution of the two heaters can be controlled according to the heat demand from the client network and the plant operation, for example during part load operation.

Another backup cooler 12 that is provided with by main cooling water 8 can be installed between the heat exchanger 3 and the $CO_2$ compressor 13. This additional cooler 12 ensures the cooling of the $CO_2$ if the network is not in operation or if its lowest water temperature is too high to make sure that the $CO_2$ is low enough to meet the temperature requirements of the $CO_2$ compressor unit 13.

The typical temperature range of the $CO_2$ upstream of the CCS captured $CO_2$ condenser 3 can be 80° C. up to 150° C. The typical temperature range of the flow of the external heat system or client network downstream of the $CO_2$ condenser 3 can range from 70° C. to 140° C.

The heat load of the $CO_2$ condenser 3 is a function of the temperature of the cooling water 8, the load of the power plant 6, and the load of the $CO_2$ capture plant 5. It is typically about 5 MWth up to 80 MWth for a combined cycle plant and about 5 MWth up 350 MWth for a steam plant.

A combination of a heat exchanger 3, a main heat exchanger CHEX, and a heat exchanger 12 allows a great versatility in the operation of the power plant with CO2 capture, that is in regard to different modes of operation under different load conditions of the power plant 6, the carbon dioxide recovery 5, and the client network 11, respectively.

The following operation concepts for the CCS captured $CO_2$ condenser 3 and the main heat exchanger(s) CHEX are facilitated by a setup according to FIG. 4 and very generally in the context of using a heat exchanger 3, a main heat exchanger CHEX, and a heat exchanger or precooler 12.

a) Operation of the power plant 6 and carbon dioxide capture 5 at full load, the client network 11 at full or part load:

$CO_2$ condenser or heat exchanger 3 at full load for client's network heat exchanger, further cooling of the captured $CO_2$ stream downstream of the CCS captured $CO_2$ condenser 3 by backup condenser 12, the steam fed heater(s) CHEX will work under full load or part load (e.g., with reduced steam extraction) depending on the heating load requirement of client network 11.

b) Operation of the power plant 6 and carbon dioxide capture 5 at part load, client network 11 at full or part load:

$CO_2$ condenser or heat exchanger 3 operating at full load, further cooling of the captured $CO_2$ flow downstream of heat exchanger 3 by heat exchanger or precooler 12, which functions as a backup heat exchanger, steam fed heat exchanger CHEX operates at full load or part load (e.g., with reduced steam extraction massflow) depending on heating load requirement of the external heat cycle system 11.

c) Operation of the power plant 6 at full load or part load, while the carbon dioxide capture plant 5 is shut down, and the client network 11 operating full or part load:

The external heat cycle system's load will be satisfied by heat exchanger CHEX. If heat exchanger CHEX is a two-stage heat exchanger system with two different steam pressure levels, distribution of heat load between the two heaters will depend on the power plant load 6 and the external heat cycle system's 11 heat load, and the minimized exergy losses due to steam extraction from power plant.

d) Operation of the power plant 6 and carbon dioxide capture 5 at full load or part load, while client network 11 is shut-down:

The $CO_2$ condenser or heat exchanger 3 is bypassed, the backup condenser or precooler 12 operates to full to provide full precooling of $CO_2$ prior to compression in unit 13.

Figure 5:
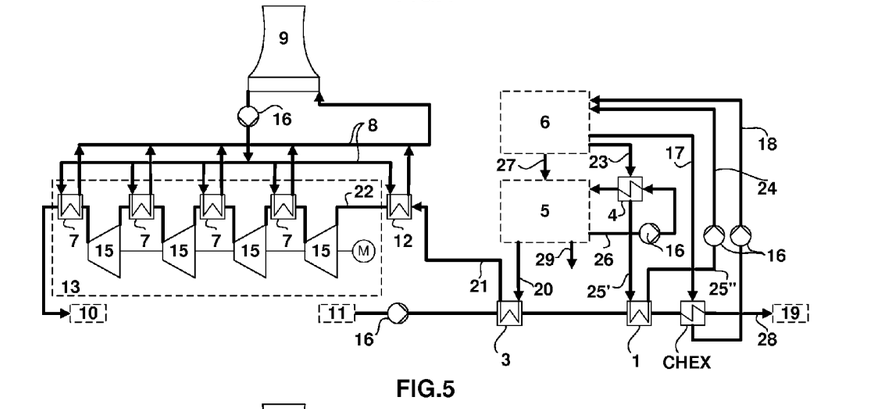
FIG. 5 shows a power plant according to a further embodiment to the invention including a steam power plant or a combined cycle power plant with a carbon dioxide capture and compression system thermally integrated with an external heat cycle system by a combination of heat exchangers.

A further example of the thermal integration of the power plant and $CO_2$ capture plant with an external heat cycle system is illustrated in FIG. 5. It includes a combination of the integration of the first heat exchanger 1 and the third heat exchanger or $CO_2$ condenser 3, together with the precooler 12 and the conventional heat exchanger CHEX operated by steam extraction from the power plant.

This specific combination of the four heat exchangers 1,3,12, and CHEX provides for even more efficient and more versatile transfer of heat from the power plant and heat generated by the carbon dioxide capture and compression process to the client network 11.

Heat required for the heating of the flow in line 28 of the external heat cycle system is provided by both the CO2 condenser 3 and the heat exchanger 1 transferring the heat from the condensate resulting from amine reboiler 4. This results in a yet lower requirement for the temperature and pressure of the steam extracted from the power plant for the conventional heat exchanger CHEX. The condensate produced in the amine reboiler 4 will be sub-cooled by heat exchanger 3. The return flow from heat exchanger 3 together with the return flow from the conventional heat exchanger CHEX will have a yet lower temperature level when it enters via line 18 back to the HRSG or boiler of the power plant 6. Thereby, the heat available in the HRSG is again used more effectively in reheating the flow of line 18.

The heat exchangers CHEX, 1, and 3 can be arranged in series, where heat exchangers 1 and 3 are arranged upstream of heat exchanger CHEX, as illustrated in FIG. 5. They can also be arranged in parallel, or in a combination of parallel and series arrangements.

Several operation concepts for the $CO_2$ condenser 3, heat exchanger 1 and conventional heat exchanger CHEX, as arranged for example in a power plant according to FIG. 5 or any of its possible variants are possible.

a) Operation of power plant 6 and carbon dioxide capture 5 at full load, operation of the client network 11 at full or part load:

The $CO_2$ condenser or heat exchanger 3 operates at full load, further cooling of the captured $CO_2$ flow downstream of the $CO_2$ condenser 3 is provided by backup heat exchanger or precooler 12. If the heat load of the client network 11 decreases, first the heat load of the conventional heat exchanger CHEX will be reduced until shut-down; if the heat load of the client network 11 further decreases, the heat load from heat exchanger 1 will be reduced.

b) Operation of both the power plant 6 and carbon dioxide capture plant 5 at part load, client network 11 at full or part load:

Heat exchanger 3 operates at full load for client's network 11. The $CO_2$ flow from the $CO_2$ capture plant 5 is cooled further by the backup condenser or precooler 12. If the heat load from network 11 is reduced, the heat load from the conventional heat exchanger CHEX will be reduced first until shut-down; if the heat load from client network 11 reduces further, the heat load of heat exchanger 1 will then be reduced.

c) Operation of the power plant 6 at full load or part load, shut-down of the carbon dioxide plant 5, operation client network 11 at full load or part load:

The client's heat load will be provided by the conventional heater(s) CHEX. If heaters CHEX are of a two-stage heat exchanger design with two different steam pressures, the heat load will be distributed between the two heaters of CHEX depending on the power plant load 6 and the heat load of client's network 11 and the minimized exergy losses due to steam extraction from power plant 6.

d) Operation of both the power plant 6 and operation of the carbon dioxide recovery 5 at full load or part load, shut-down of client network 11:

Heat exchanger 3 and heat exchanger 1 will be bypassed, 100% of $CO_2$ cooling performed by backup heat exchanger or precooler 12. The return condensate from the amine reboiler 4 goes directly back to the power plant 6.

Figure 6:
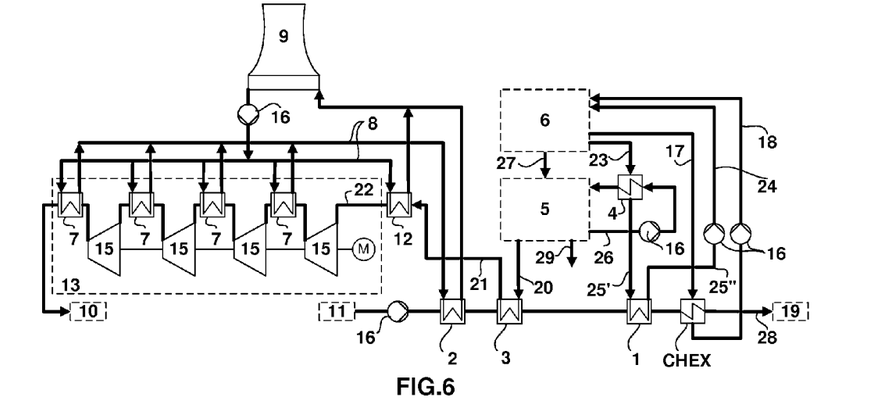
FIG. 6 shows a power plant according to a further embodiment to the invention including a steam power plant or a combined cycle power plant with a carbon dioxide capture and compression system thermally integrated with an external heat cycle system by a further combination of heat exchangers.

A further embodiment of the integration of $CO_2$ capture plant 5 with power plant 6 and external heat cycle system 11 is illustrated in the schematic of FIG. 6.

This power plant system includes all the of the first, second, and third heat exchangers 1, 2, and 3 in addition to the convention heat exchanger CHEX arranged to heat the flow of the external heat cycle system and thereby putting to use all of the possibilities of integrating the heat available from the $CO_2$ capture and compression and cooling system in the external heat cycle system. The arrangement of FIGS. 2, 3, and 4 are thereby integrated in one power plant. By this integration, heat from the return condensate of the amine reboiler 4 together with the heat from the $CO_2$ condenser 3 and the heat from the cooling medium inline 8 of the $CO_2$-precooler 12 and $CO_2$-intercoolers 7 is all used to heat the flow medium of the heat cycle system 11. Thereby, the benefit of reducing the steam extraction massflow in line 17 can be increased and the operation of the HRSG made more effective.

The heat exchangers as shown in FIGS. 2-6, can be arranged in the client network line 28 depending on the specific relative temperature levels of their flow media in order to allow for the most efficient heat transfer between the individual cycle heat exchangers. In FIGS. 2-6, the heat exchangers may be arranged in different series arrangements as well as in different parallel arrangements. Also the heat exchangers CHEX, 1, 2, 3, may be realized by several individual heat exchanger apparatuses arranged in parallel or in series.

Instead of only integrating the heat of the heat exchanger 3, the $CO_2$ inter coolers and after-cooler 7 can also be integrated, either directly or indirectly, into the client network 11 by the heat exchanger 2 and the intermediate loop of cooling water 8. The intermediate loop 8 is needed to ensure the protection of the main condensate from a $CO_2$ leakage at the $CO_2$ inter-coolers or after-cooler. The cooling tower 9 (or another cooling device) is still needed to finalize the cooling if the inlet temperature from the client network 11 is too high or if the district heating is not in operation. This will ensure a good efficiency of the $CO_2$ compressor unit 13.

The heat exchangers 2 and 3 can be arranged in series or in parallel.

The typical temperature range of the $CO_2$ upstream of the $CO_2$ inter-coolers and after-cooler 7 is in the range of 100° C.-230° C., depending on the inlet temperature and on the arrangement of the coolers.

The following operation concepts for the heat exchanger 2 in a setup according to FIG. 3 are possible:

a) Power plant 6 and carbon dioxide recovery 5 at full load or part load, client network 11 at full load or part load:

Certain rate integrated by heat exchanger 2, the rest to backup cooling device 9.

b) Power plant 6 and carbon dioxide recovery 5 at full load or part load, client network 11 shut-down:

Heat exchanger 2 is bypassed, 100% on backup cooling device 9.

The operation concepts for the $CO_2$ condenser 3 and the heater(s) CHEX for such a setup according to FIG. 6 are analogous to the ones discussed with respect to other figures.

LIST OF REFERENCE SIGNS

CHEX conventional heat exchanger using steam extraction from steam power plant for external heat cycle system 1 first heat exchanger using heat from amine reboiler of carbon capture plant
2 second heat exchanger using heat from $CO_2$ compression and cooling unit
3 third heat exchanger using heat from carbon capture plant
4 amine reboiler
5 carbon dioxide capture plant
6 power plant
7 intercooler in $CO_2$ compression unit
8 cooling water lines for $CO_2$ compression and cooling unit
9 cooling tower
10 carbon dioxide storage facility
11 from client network
12 backup cooler
13 carbon dioxide compression and cooling unit
15 compressor
16 pump
17 steam extraction from the steam turbine of power plant
18 recirculation line, condensate return
19 to client network
20 line for $CO_2$ flow from carbon dioxide capture plant to carbon dioxide compressor unit
21 line for $CO_2$ flow to $CO_2$ precooler
22 line for $CO_2$ flow from $CO_2$ precooler to $CO_2$ compressor
23 steam extraction line to amine reboiler
24 line for return condensate from amine reboiler
25 line for return condensate from amine reboiler
25' line for return condensate to the first heat exchanger
25" line from first heat exchanger to feedwater pump
26 line for amine solution
27 flue gas line
28 line for external heat cycle system, e.g. district heating water
29 flue gas free of $CO_2$
M motor While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for operation of a power plant system including a power plant for generation of electricity, an external heat cycle system, and a carbon dioxide capture and compression system, the carbon dioxide capture and compression system comprising a carbon dioxide capture plant and a carbon dioxide compression unit, the method comprising:

operating the carbon dioxide capture plant to absorb carbon dioxide from exhaust gases of the power plant with an absorber solution and release the absorbed carbon dioxide from the absorber solution to form a carbon dioxide gas stream and an absorber solution by directing the absorber solution through a reboiler;

forwarding the carbon dioxide gas stream to the carbon dioxide compression unit configured to compress and cool the carbon dioxide gas stream;

operating a main heat exchanger to transfer heat from a steam flow extracted from the power plant to a flow medium of the external heat cycle system and direct a return flow from the main heat exchanger to a water steam cycle of the power plant;

transferring heat from the carbon dioxide capture plant and the carbon dioxide compression unit to the flow medium of the external heat cycle system with at least one additional heat exchanger, wherein the least one additional heat exchanger comprises a first heat exchanger, a second heat exchanger, and a third heat exchanger; and directing a return flow from the first heat exchanger of the at least one additional heat exchanger to the power plant;

and directing a return flow from the third heat exchanger of the at least one additional heat exchanger to the carbon dioxide compression unit.

2. The method according to claim 1, further comprising:

operating the at least one additional heat exchanger for the cooling of carbon dioxide in the carbon dioxide compression unit;

directing a flow from the first heat exchanger of the at least one additional heat exchanger to the second heat exchanger of the at least one additional heat exchanger;

operating the second heat exchanger of the at least one additional heat exchanger to transfer heat to the flow medium of the external heat cycle system; and directing a first return flow from the second heat exchanger of the at least one additional heat exchanger to a cooling cycle for compressed carbon dioxide operatively connected to the carbon dioxide compression unit.

3. The method according to claim 2, further comprising:

operating the second heat exchanger of the at least one additional heat exchanger in series with the main heat exchanger; and operating the main heat exchanger downstream of the second heat exchanger of the at least one additional heat exchanger in the direction of the flow medium of the external heat cycle system.

4. The method according to claim 2, further comprising:

directing a condensate flow from the reboiler to the first heat exchanger of the at least one additional heat exchanger for heat exchange with the flow medium of the external heat cycle system; and directing a second return flow from the first heat exchanger of the at least one additional heat exchanger as a condensate flow to the water steam cycle of the power plant;

wherein the first heat exchanger of the at least one additional heat exchanger and the second heat exchanger of the at least one additional heat exchanger are operated in series.

5. The method according to claim 1, further comprising:

directing a carbon dioxide flow generated by the carbon dioxide capture plant to the third heat exchanger of the at least one additional heat exchanger;

operating the third heat exchanger of the at least one additional heat exchanger to transfer heat from the carbon dioxide flow to the flow medium of the external heat cycle system; and directing a carbon dioxide flow returning from the third heat exchanger to the carbon dioxide compressing unit.

6. The method according to claim 5, further comprising:

operating the third heat exchanger of the at least one additional heat exchanger in series with the main heat exchanger; and operating the main heat exchanger downstream of the third heat exchanger of the at least one additional heat exchanger in the direction of the flow medium of the external heat cycle system.

7. The method according to claim 5, further comprising:

directing a return condensate flow from the reboiler to the first heat exchanger of the at least one additional heat exchanger for heat exchange with the flow medium of the external heat cycle system; and directing a second return flow from the first heat exchanger of the at least one additional heat exchanger as a condensate flow to the water steam cycle of the power plant;

wherein the first heat exchanger of the at least one additional heat exchanger and the third heat exchanger of the at least one additional heat exchanger are operated in series.

8. The method according to claim 5, further comprising:

operating the at least one additional heat exchanger for the cooling of carbon dioxide in the carbon dioxide compression unit;

directing the second return flow from the at least one additional heat exchanger to the second heat exchanger of the at least one additional heat exchanger;

operating the second heat exchanger of the at least one additional heat exchanger to transfer heat to the flow medium of the external heat cycle system; and directing a first return flow from the second heat exchanger of the at least one additional heat exchanger to a cooling cycle operatively connected to the carbon dioxide compression unit;

wherein the second heat exchanger of the at least one additional heat exchanger and the third heat exchanger of the at least one additional heat exchanger are operated in series.

9. The method according to claim 5, further comprising:

directing a condensate flow from the reboiler to the first heat exchanger of the at least one additional heat exchanger for heat exchange with the flow medium of the external heat cycle system;

directing a second return flow from the first heat exchanger of the at least one additional heat exchanger as a condensate flow to the water steam cycle of the power plant;

operating at least one heat exchanger of the at least one additional heat exchanger for the cooling of carbon dioxide in the carbon dioxide compression unit;

directing the second return flow from the first heat exchanger of the at least one heat exchanger of the at least one additional heat exchanger to the second heat exchanger of the at least one additional heat exchanger;

operating the second heat exchanger of the at least one additional heat exchanger to transfer heat to the flow medium of the external heat cycle system; and directing the first return flow from the second heat exchanger of the at least one additional heat exchanger to a cooling cycle operatively connected to the carbon dioxide compression unit wherein the first heat exchanger of the at least one additional heat exchanger and the second heat exchanger of the at least one additional heat exchanger and the third heat exchanger of the at least one additional heat exchanger are operated in series.

10. A power plant system comprising:

a power plant configured and arranged to generate electricity, the power plant including a steam extraction;

a carbon dioxide capture and compression system, the carbon dioxide capture and compression system comprising a carbon dioxide capture plant and a carbon dioxide compression unit, the carbon dioxide capture plant configured to maintain a cycle comprising an absorber solution configured and arranged to absorb carbon dioxide from exhaust gases of the power plant, and a reboiler configured and arranged to receive and heat the absorber solution and release the absorbed carbon dioxide to at least one of the carbon dioxide capture plant;

wherein concentrated carbon dioxide released from the carbon dioxide capture plant is passed to the carbon dioxide compression unit;

an external heat cycle system;

a main heat exchanger configured and arranged to heat flow medium of the external heat cycle system, wherein the power plant is operatively connected to the external heat cycle system by the steam extraction from the power plant and the main heat exchanger;

at least one additional heat exchanger comprising a first heat exchanger, a second heat exchanger, and a third heat exchanger, configured and arranged to heat the flow medium of the external heat cycle system with at least one heat flow generated by the carbon dioxide capture plant and the compression unit from a carbon dioxide gas, the at least one additional heat exchanger being configured and arranged to direct a return flow to the power plant and carbon dioxide compression unit, the at least one additional heat exchanger arranged at least one of in series upstream of the main heat exchanger.

11. The power plant system according to claim 10, wherein the power plant system comprises a water steam, a first line configured and arranged to direct a flow of condensate from the reboiler to the first heat exchanger of the at least one additional heat exchanger; and a second line configured and arranged to return condensate from the first heat exchanger of the at least one additional heat exchanger to the water steam cycle of the power plant.

12. The power plant system according to claim 11, wherein:

the first heat exchanger of the at least one additional heat exchanger is arranged in series with the main heat exchanger; and the main heat exchanger is arranged downstream of the first heat exchanger of the at least one additional heat exchanger in the direction of flow medium of the external heat cycle system.

13. The power plant system according to claim 10, wherein the second heat exchanger of the at least one additional heat exchanger is configured and arranged to heat flow medium of the external heat cycle system, and further comprising:

a cooling tower;

a cooling cycle for compressed carbon dioxide operatively connected to the carbon dioxide compression unit;

a third line configured and arranged to direct cooling medium of a carbon dioxide compression and cooling unit from the cooling tower to the second heat exchanger of the at least one additional heat exchanger; and a fourth line configured and arranged to return flow from the second heat exchanger of the at least one additional heat exchanger to the cooling cycle operatively connected to the carbon dioxide compression unit.

14. The power plant system according to claim 13, wherein:

the second heat exchanger of the at least one additional heat exchanger is arranged in series with the main heat exchanger; and the main heat exchanger is arranged downstream of the second heat exchanger of the at least one additional heat exchanger in the direction of flow medium of the external heat cycle system.

15. The power plant system according to claim 13, wherein the power plant comprises a water steam cycle, and further comprising:

a first line configured and arranged to direct a flow of condensate from the reboiler to the first heat exchanger of the at least one additional heat exchanger; and a second line configured and arranged to return condensate from the first heat exchanger of the at least one additional heat exchanger to the water steam cycle of the power plant;

wherein the first heat exchanger of the at least one additional heat exchanger and the second heat exchanger of the at least one additional heat exchanger are arranged in series with respect to flow medium of the external heat cycle system.

16. The power plant system according to claim 10, wherein the carbon dioxide capture and compression system comprises the carbon dioxide compression unit, and the third heat exchanger of the at least one additional heat exchanger is configured and arranged to heat flow medium of the external heat cycle system with a carbon dioxide flow generated by the carbon dioxide capture plant, and further comprising:

a line leading from the carbon dioxide capture plant to the third heat exchanger of the at least one additional heat exchanger; and a further line leading from the third heat exchanger of the at least one additional heat exchanger to the carbon dioxide compression unit.

17. A power plant system according to claim 16, wherein:

the third heat exchanger of the at least one additional heat exchanger is arranged in series with the main heat exchanger; and the main heat exchanger is arranged downstream of the third heat exchanger of the at least one additional heat exchanger in the direction of flow medium of the external heat cycle system.

18. The power plant system according to claim 16, wherein the power plant comprises a water steam cycle, and further comprising:

a first line configured and arranged to return condensate from the reboiler to the first heat exchanger of the at least one additional heat exchanger; and a second line configured and arranged to return condensate from the first heat exchanger of the at least one additional heat exchanger to the water steam cycle of the power plant;

wherein the first heat exchanger of the at least one additional heat exchanger and the third heat exchanger of the at least one additional heat exchanger are arranged in series with respect to the flow medium of the external heat cycle system.

19. A power plant system according to claim 16, wherein the second heat exchanger of the at least one additional heat exchanger configured and arranged to heat flow medium of the external heat cycle system, and further comprises:

a cooling tower;

a cooling cycle operatively connected to the carbon dioxide compression unit;

a third line configured and arranged to direct cooling medium of a carbon dioxide compression and cooling unit leading from the cooling tower to the second heat exchanger of the at least one additional heat exchanger; and a fourth line configured and arranged to return flow from the second heat exchanger of the at least one additional heat exchanger to the cooling cycle operatively connected to the carbon dioxide compression unit;

wherein the second heat exchanger of the at least one additional heat exchanger and the third heat exchanger of the at least one additional heat exchanger are arranged in series with respect to the flow medium of the external heat cycle system.

* * * * *